July 9, 1946.  L. P. SHARPLES  2,403,831
FUEL FEEDING AND COOLING SYSTEM
Filed Sept. 26, 1942
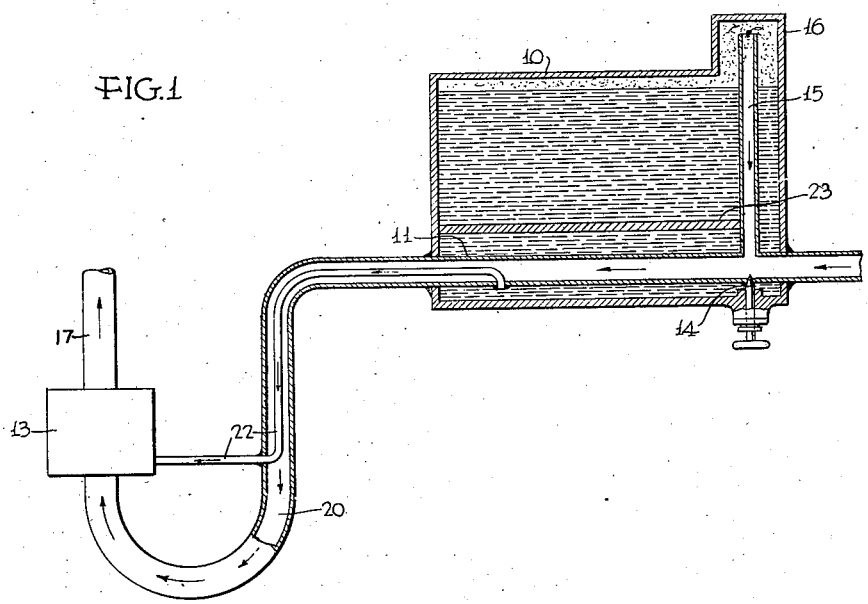
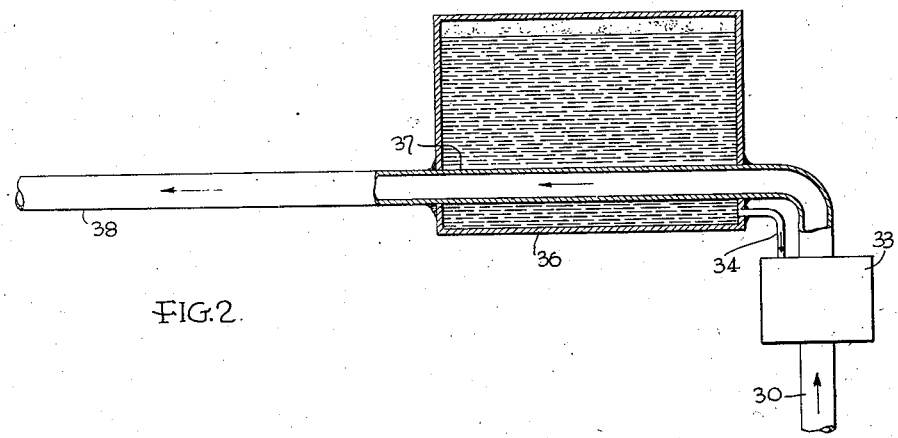
INVENTOR
Laurence P. Sharples.
BY Maurice A. Crews
ATTORNEY Patented July 9, 1946

2,403,831

UNITED STATES PATENT OFFICE 2,403,831

FUEL FEEDING AND COOLING SYSTEM

Laurence Price Sharples, Ardmore, Pa., assignor to The Sharples Corporation, Philadelphia, Pa., a corporation of Delaware Application September 26, 1942, Serial No. 459,847

6 Claims. (Cl. 158—36)

The present invention pertains to the art of motors which derive their motive force from the combustion of a mixture of a normally liquid fuel with a gaseous combustion agent such as air. It is more particularly concerned with problems of feeding gasoline to the internal combustion engine of a vehicle at high altitudes; e. g., as sometimes encountered in airplane operation. In the operation of an airplane at high altitudes, temperatures and barometric pressures are sometimes encountered which cause the fuel to boil, resulting in waste. Even though pressure and turbulence conditions may not be such as to cause the fuel to boil in the main body of the tank, it may boil in the fuel line from the tank to the carburetor or near the entrance to the fuel line due to pressure drop in the fuel line caused by friction and/or to turbulence in the fuel line and/or turbulence at the inlet caused by a booster pump. This may cause vapor lock which will reduce the capacity of the fuel line by restricting the flow. If the airplane is flown to a height which will cause the fuel in the supply tank to boil, and the plane is then maintained at that height, the fuel will reach an equilibrium point, due to self-refrigeration and/or loss of light ends, at which time boiling will cease until the temperature is slightly increased or the pressure is slightly decreased or turbulence created. Under such condition vapor lock will probably occur in the fuel line for reasons above given.

One method of reducing these difficulties is to maintain the fuel tank under pressure. If the pressure is high enough, the fuel in the tank and in the line will be kept above the boiling point and a positive pressure will be present to force the fuel through to the carburetor pump. A disadvantage of this pressurized tank system, however, is that the tank must be made heavier than would otherwise be necessary, in order that it may be capable of withstanding the difference between this increased internal pressure and the atmospheric pressure without. The resulting increase in weight may amount to as much as 1 pound per each 10 gallons of fuel capacity. Another disadvantage is that if the tank is of the self-sealing type, the self-sealing operation after rupture does not operate as satisfactorily as though the tank were not pressurized. A further disadvantage of such a system is the increased fire and explosion hazard in case of accident.

Another method of reducing vapor lock in the fuel line is to place a booster pump at the outlet of the fuel tank. This puts the fuel line under pressure and reduces vaporization therein. It does not, however, prevent loss of fuel by evaporation from the tank, and such evaporation may be serious. For instance, if the tank is full of a certain normal grade of fuel at 100° F. when leaving the ground, and the plane is flown to an altitude of 40,000 ft., approximately 10% of the fuel will evaporate before the fuel is cooled as the result of extraction of the heat of vaporization of the evaporated fuel, to a temperature of 68° F., at which the equilibrium point is reached which results in cessation of boiling. The use of a booster pump is also disadvantageous because of the extra weight, extra electrical equipment, and extra maintenance cost involved in its use.

The present invention provides an arrangement and method of cooling and feeding fuel to a combustion motor to obviate the above difficulties, without resorting necessarily to use of either a pressurized tank or a booster pump. This result is accomplished by passing the cold combustion gas, such as air, into heat exchange relationship with the fuel in the tank in passing such air to the motor. Such air is mixed with the fuel, and the resulting mixture is used in operation of the motor. Since the air used to effect the fuel cooling function is the same air as that used to cause combustion, no additional load is imposed upon the driving of the airplane by reason of the friction loss incident to cooling of the fuel by passing this air in heat exchange relationship to the fuel in the tank.

An additional feature of the invention by which the desired result is facilitated consists in the bleeding of gasoline from the tank into the stream of air employed for cooling, in order to obtain additional refrigeration by reason of extraction of the heat of vaporization in so evaporating the gasoline.

In the practice of the invention, the mixture of air and fuel resulting from performance of the cooling function as discussed immediately above is passed through the carburetor to the intake manifold of the motor, and the fuel vaporized in cooling the remaining fuel in the tank thus effects the desired cooling function without, itself, being wasted.

The air may be passed in heat exchange relationship to the fuel in the fuel tank before passing to the carburetor, or it may first be passed through the carburetor and mixed with the fuel of the combustion charge and then passed together with the admixed fuel in heat exchange relationship to the remaining fuel in the tank. If this latter type of operation is employed, the evaporation of the fuel mixed with the air cools the air before this air is used to extract heat from the fuel in the tank, thereby still further assisting in reducing the temperature of the fuel in the tank. Furthermore, the fuel line in this case may be so short that little pressure drop or tendency to vapor lock will be present, particularly as the low temperature of the carburetor body will to some extent be transferred to it.

In the drawing,

Figure 1 is a schematic illustration of one embodiment of the invention, and

Figure 2 is a schematic illustration of an alternative embodiment.

As illustrated in Figure 1 of the drawing, the fuel tank 10 is connected to a conduit 11 for the air used for combustion of the fuel, and this conduit extends through the space normally occupied by the fuel. Air passing through extension 20 of conduit 11 passes through carburetor 13, where it is admixed with fuel conducted to the carburetor through conduit 22. The air passing through the conduit 11 to the carburetor cools the fuel surrounding that conduit in tank 10. 17 is the intake pipe leading from the carburetor 13 to a motor (not shown).

Supplemental cooling may be effected by permitting a small amount of fuel to be bled through a needle valve 14 into the conduit 11 and vaporized in the advancing stream of air, the needle valve 14 being preferably controlled from the cockpit of the airplane.

A branch conduit 15 interconnects conduit 11 with a dome 16 in the top of tank 10, and any fuel which may be vaporized in spite of the above-discussed cooling features will thus enter the air stream by descending through conduit 15.

A baffle plate 23 may be provided and extend across a portion of the tank in the neighborhood of conduit 11, in order to minimize heat transfer between conduit 11 and the gasolene in the main body of the tank, and thereby intensify the cooling effect adjacent conduit 11.

In the embodiment of Figure 2 of the drawing, air from conduit 30 is passed to the carburetor 33, where it is mixed with fuel fed to the carburetor through conduit 34 from tank 36. The combustion mixture leaving the carburetor is passed to the engine intake 38 through a conduit 37 extending through the fuel space of the tank 36, and the fuel in the tank 36 is cooled by the resulting exchange of heat.

Various modifications are possible within the scope of the invention, and I do not wish to be limited except by the scope of the following claims.

I claim:

1. In a fuel feeding and cooling system for an internal combustion motor, the combination comprising a fuel storage supply tank, a pipe having two sections, a carburetor having an inlet and outlet, means for passing liquid fuel from said tank to said carburetor, one section of the said pipe being connected to said inlet and the other section connected to said outlet, the said one section of said pipe having an end adapted to communicate with the atmosphere for supplying said carburetor with air, the said other section having an end adapted to be connected to the motor for supplying thereto the said air mixed with fuel vapor from the carburetor, the said pipe also having a substantial portion of one of said sections extending through said tank for passing the contents of said pipe through indirect heat exchange relationship to the fuel-containing space of said tank without passing said contents directly into said fuel-containing space.

2. In a fuel feeding and cooling system for a motor, the combination comprising a fuel storage supply tank, a carburetor separate from said tank, means for passing liquid fuel from said tank to said carburetor, a conduit having a part passing through said tank for passing air through indirect heat exchange relationship to the fuel storage space of said tank without passing said air directly into the fuel-containing space of said tank, means for thereafter passing said air to said carburetor where it is mixed with fuel from said tank after passage through said heat exchange relationship, and means for passing the resulting mixture to a motor.

3. In a fuel feeding and cooling system for a motor, the combination comprising, a fuel storage supply tank, a carburetor separate from said tank, means for passing liquid fuel from said tank to said carburetor, means for passing air to said carburetor where it is fixed with fuel from said tank, a conduit having a part passing through said tank connected to said carburetor for passing the resulting mixture of air and fuel through indirect heat exchange relationship to the fuel storage space of said tank without passing said mixture directly into the fuel-containing space of said tank, and means for directing said mixture to a motor after passage thereof through said heat exchange relationship.

4. In a fuel feeding and cooling system for a motor, the combination comprising a fuel storage supply tank, a carburetor separate from said tank, a motor intake pipe connected to said carburetor for leading combustible mixtures to a motor, means for passing liquid fuel from said tank to said carburetor, a conduit in ported communication with said carburetor having a part passing through said tank for passing air through indirect heat exchange relationship to the fuel storage space of said tank without passing said air directly into the fuel-containing space of said tank, and means establishing communication between said fuel in said tank and said flowing stream of air, whereby a part of the fuel from said tank will be vaporized into said flowing stream of air during passage thereof through the portion of said air supply conduit passing through said storage space of said fuel supply tank to the motor.

5. In a fuel feeding and cooling system for a motor, the combination comprising a fuel storage supply tank, a carburetor separate from said tank, a motor intake pipe connected to said carburetor for leading combustible mixtures to a motor, means for passing liquid fuel from said tank to said carburetor, a conduit having a part passing through said tank for passing air through indirect heat exchange relationship to the fuel storage space of said tank without passing said air directly into the fuel-containing space of said tank, and means establishing communication between said fuel in said tank and said flowing stream of air, whereby a part of the fuel from said tank will be vaporized into said flowing stream of air.

6. In a fuel feeding and cooling system for a motor, the combination comprising a fuel storage supply tank, a carburetor separate from said tank, a motor intake pipe connected to said carburetor for leading combustible mixtures to a motor, a conduit for passing liquid fuel from said tank to said carburetor, a second conduit having a part passing through said tank for passing air through indirect heat exchange relationship to the fuel storage space of said tank without passing said air directly into the fuel-containing space of said tank, and means for directing said air to said carburetor after passage thereof through said heat exchange relationship to said tank, the conduit for passing liquid fuel from said tank to said carburetor lying, along at least a part of its length, within the conduit for passing air to said carburetor, whereby said liquid fuel is cooled during its passage to the carburetor.

LAURENCE PRICE SHARPLES.